United States Patent
Ishikawa et al.

(10) Patent No.: US 8,586,885 B2
(45) Date of Patent: Nov. 19, 2013

(54) FORCE-FEEDBACK MULTIDIRECTIONAL INPUT DEVICE

(75) Inventors: Shinji Ishikawa, Miyagi-ken (JP); Hajime Suzuki, Miyagi-ken (JP)

(73) Assignee: Alps Electric Co., Ltd., Tokyo (JP)

(*) Notice: Subject to any disclaimer, the term of this patent is extended or adjusted under 35 U.S.C. 154(b) by 306 days.

(21) Appl. No.: 13/247,464

(22) Filed: Sep. 28, 2011

(65) Prior Publication Data

US 2012/0080294 A1    Apr. 5, 2012

(30) Foreign Application Priority Data

Oct. 5, 2010   (JP) ................................ 2010-225631

(51) Int. Cl.
*H01H 25/00* (2006.01)
(52) U.S. Cl.
USPC ........................... 200/5 R; 200/252; 200/341
(58) Field of Classification Search
USPC ...... 200/4, 5 R, 17 R, 18, 520, 521, 547–550, 200/252, 257, 260, 308, 341
See application file for complete search history.

(56) References Cited

U.S. PATENT DOCUMENTS

| | | | | |
|---|---|---|---|---|
| 5,012,230 A | * | 4/1991 | Yasuda | 345/184 |
| 5,883,346 A | * | 3/1999 | Stocken | 200/4 |
| 5,920,042 A | * | 7/1999 | Gotoh | 200/5 R |
| 6,396,015 B1 | * | 5/2002 | Ko | 200/529 |
| 6,515,241 B2 | * | 2/2003 | Saiki | 200/5 R |
| 6,796,201 B2 | | 9/2004 | Onodera | |
| 7,439,460 B1 | * | 10/2008 | Watson | 200/5 R |
| 2003/0011569 A1 | | 1/2003 | Onodera | |
| 2004/0060807 A1 | | 4/2004 | Nishimoto et al. | |
| 2009/0225027 A1 | | 9/2009 | Itoh et al. | |
| 2010/0011903 A1 | | 1/2010 | Koschke et al. | |
| 2012/0061225 A1 | * | 3/2012 | Fujikawa et al. | 200/5 R |

FOREIGN PATENT DOCUMENTS

| | | |
|---|---|---|
| DE | 10339469 A1 | 3/2004 |
| DE | 102007012278 A1 | 9/2008 |
| DE | 102009012167 A1 | 9/2009 |
| EP | 1276032 A1 | 1/2003 |
| EP | 1621954 A1 | 2/2006 |

OTHER PUBLICATIONS

Extended European Search Report issued in corresponding European Patent Application No. 11179679.3, mailed Jan. 24, 2012.

* cited by examiner

*Primary Examiner* — Felix O Figueroa
(74) *Attorney, Agent, or Firm* — Brinks Gilson & Lione (57) ABSTRACT

A force-feedback multidirectional input device includes a slider slidably supported by a support base and an operation knob joined to the slider. In a sliding operation, the slider operates in conjunction with actuating members included in a force-feedback unit. Therefore, a sense of force based on the sliding is fed back to the operation knob. Furthermore, the slider is elastically urged by coil springs toward an inner bottom surface of a housing space defined in the support base. In a depressing operation, the operation knob presses the support base downward against the urging force of coil springs. Therefore, a vertically movable member joined to the support base is moved downward along guide portions (convex rails and concave grooves). Thus, a push switch provided on a pedestal (circuit board) is pressed and activated by the vertically movable member.

5 Claims, 9 Drawing Sheets

FORCE-FEEDBACK MULTIDIRECTIONAL INPUT DEVICE

CLAIM OF PRIORITY

This application claims benefit of Japanese Patent Application No. 2010-225631 filed on Oct. 5, 2010, which is hereby incorporated by reference in its entirety.

BACKGROUND

1. Field of the Disclosure

The present disclosure relates to force-feedback multidirectional input devices electrically controlled by a manually operated knob and configured to feed back the sense of a force, and particularly to a force-feedback multidirectional input device allowing a lateral sliding operation and a depressing operation (pushing operation).

2. Description of the Related Art

In recent years, force-feedback multidirectional input devices intended for in-car control apparatuses such as air conditioners, audio systems, and navigation systems have been proposed. In such input devices, when function adjustment or the like is performed by manually operating an operation knob, an external force (sense of a force) such as resistance or thrust corresponding to the amount and direction of operation performed on the operation knob is fed back, whereby a good operational feeling is provided so that a desired operation can be reliably performed. An exemplary related-art force-feedback multidirectional input device allows a rocking operation and includes an actuating member having a lever portion and a gear portion, a rockable operation knob provided at the top of the lever portion and with which the actuating member is tilted, a rotary motor whose drive shaft rotates in conjunction with the gear portion of the actuating member, and detecting means capable of detecting the tilting of the actuating member. In this input device, driving of the drive shaft of the rotary motor is controlled in accordance with a signal that is output from the detecting means. Thus, the rotary motor feeds back the sense of force to the operation knob through the actuating member.

Another force-feedback multidirectional input device disclosed by Japanese Unexamined Patent Application Publication No. 2009-217359 allows a rocking operation and a depressing operation (pushing operation). This input device includes a push switch provided between an operation knob and a lever portion of an actuating member. When the user depresses the operation knob, the downward movement of the operation knob turns the push switch on. Therefore, a series of operation can be performed in which, for example, the operation knob is rocked to select any item from a menu and is then depressed to fix the selected item. Thus, the practical value of the force-feedback multidirectional input device is increased.

Yet another force-feedback multidirectional input device disclosed by Japanese Unexamined Patent Application Publication No. 2003-31074 allows a sliding operation. In this input device, an operation knob is joined to a slider at the top of a stem of the slider. The slider is supported by a guide wall provided on a pedestal and is slidable in the lateral direction. The sliding movement of the slider causes actuating members to actuate in conjunction with drive shafts of rotary motors through transmission gears or the like. Any changes in the positions of the actuating members are detected by detecting means. In this input device, the operation knob is slidable along the front surface of a decorative panel on which the input device is mounted. Therefore, the amount of projection of the operation knob from the decorative panel can be reduced significantly. Moreover, the user can sense the direction and amount of operation performed on the operation knob more easily than in the cases of rockable input devices. Therefore, if a push switch allowing a depressing operation is added to such a slidable force-feedback multidirectional input device, the practical value of the input device is expected to increase significantly.

Nevertheless, if a push switch is provided between a rockable operation knob and a lever portion of an actuating member as in the case of the force-feedback multidirectional input device disclosed by Japanese Unexamined Patent Application Publication No. 2009-217359, the push switch needs to be electrically wired in such a manner as to follow the rocking of the operation knob, resulting in complicated wiring. In such a case, wires may be broken with an excessively large operational force. Moreover, it is not very easy to smoothly perform a series of rocking and depressing operations on the operation knob, meaning that there is yet room for improvement in terms of ease of operation.

In the force-feedback multidirectional input device disclosed by Japanese Unexamined Patent Application Publication No. 2003-31074, clearances need to be provided between the guide wall of the pedestal slidably supporting the slider and the slider and between the slider and the actuating members moved by the slider. These clearances are liable to cause rattling of the slider and the operation knob while the input device is not operated, generating unpleasant sound (rattle noise) while the car is being driven. Moreover, in the slidable force-feedback multidirectional input device also, if a push switch is provided between the operation knob and the stem of the slider so as to allow the depressing operation, the electrical wiring for the push switch become very complicated, and wire breakage is liable to occur.

SUMMARY

A force-feedback multidirectional input device includes a base body having a housing space; a slider supported in such a manner as to be slidable along an inner bottom surface of the housing space; an operation knob joined to the slider and exposed at the top of the base body; a force-feedback unit including a driving-force-transmitting mechanism engaged with the slider, the unit being capable of feeding back, to the operation knob, a sense of force acting in a planar direction based on the sliding of the slider; a pedestal on which the force-feedback unit is provided; depressing-detecting mechanism that detects depressing (pushing) of the operation knob, the depressing-detecting mechanism being provided on the pedestal; a first urging mechanism that elastically urges the base body upward; and a second urging mechanism that elastically urges the slider toward the inner bottom surface of the housing space. The base body is supported in such a manner as to be movable in a vertical direction relative to the pedestal. When the operation knob is depressed, the slider is depressed and causes the base body to move downward against the urging force of the first urging mechanism, the downward movement of the base body realizing the detection performed by the depressing-detecting mechanism.

DESCRIPTION OF THE EXEMPLARY EMBODIMENTS

Figure 1:
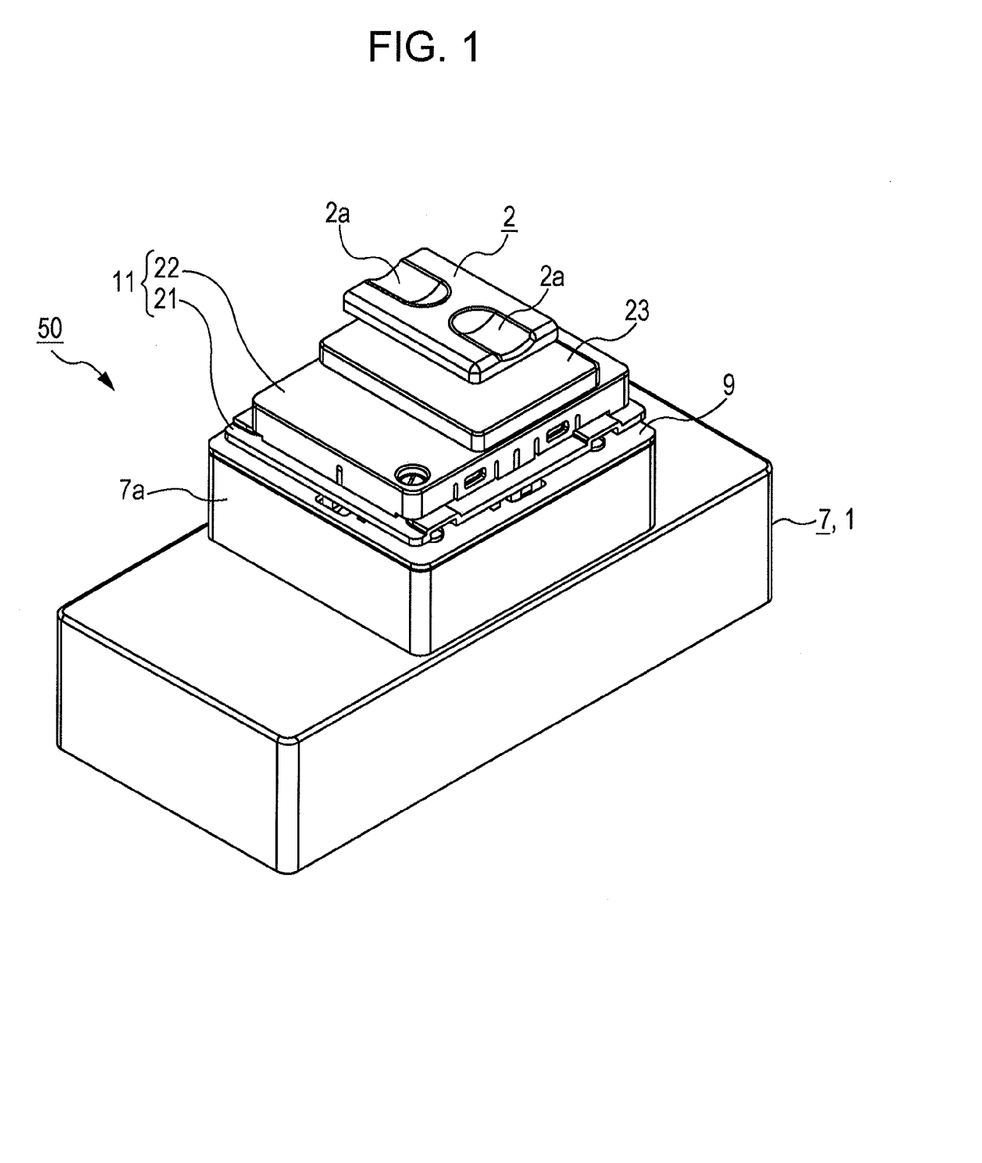
FIG. 1 is an external perspective view of a force-feedback multidirectional input device according to an embodiment of the present invention.
Figure 8:
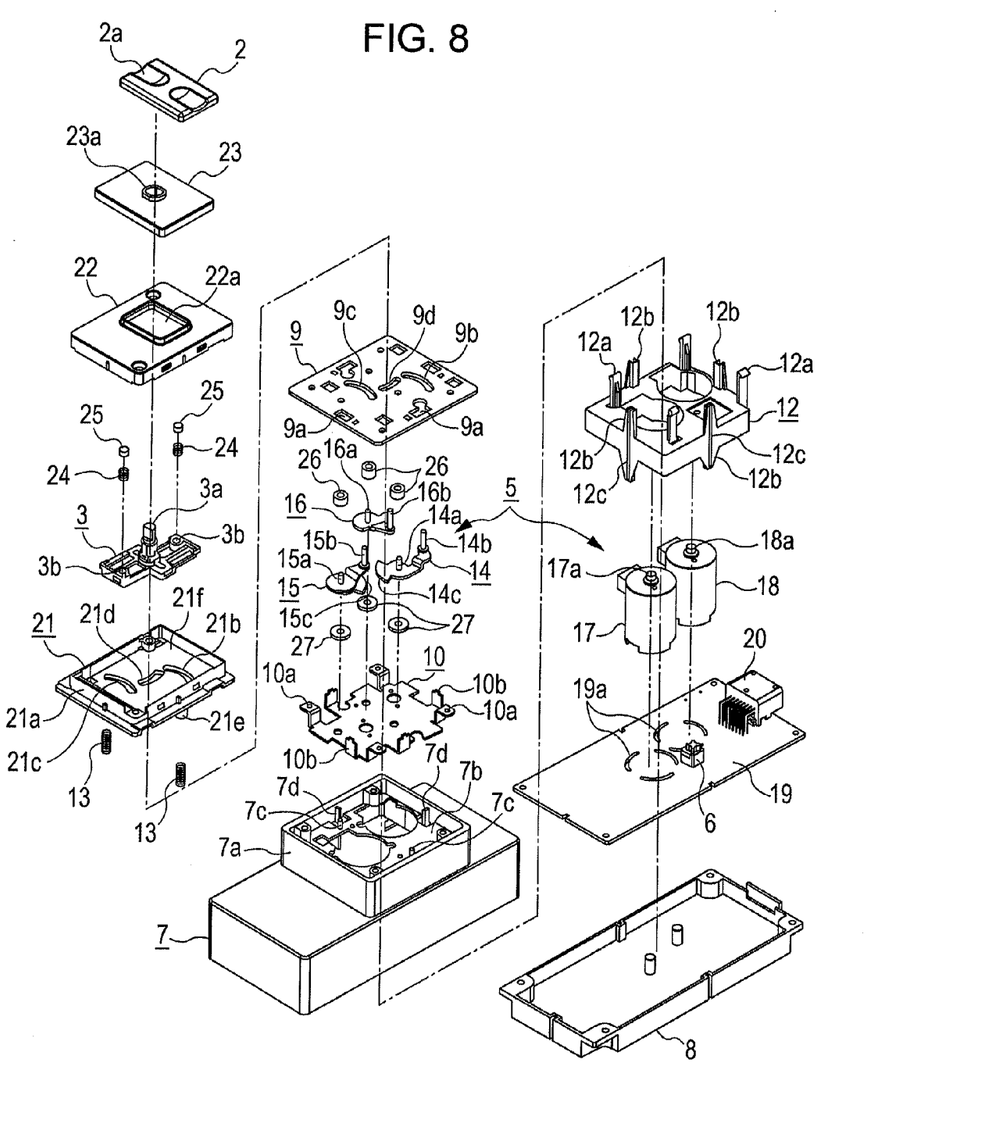
FIG. 8 is an exploded perspective view of the input device illustrated in FIG. 1.

Embodiments of the present invention will now be described with reference to the accompanying drawings. FIG. 1 illustrates the appearance of a force-feedback multidirectional input device 50 according to the present embodiment including members illustrated in exploded perspective view in FIG. 8.

Specifically, the force-feedback multidirectional input device 50 basically includes a pedestal 1, an operation knob 2, a slider 3, a base body 4, a force-feedback unit 5, and depressing-detecting means, which is preferably a push switch 6. The operation knob 2 allows a sliding operation in any direction along the base body 4 and a depressing operation (pushing operation) in a direction orthogonal to the sliding direction.

The outline configuration will be described first. The pedestal 1 is a structure including a hollow housing 7 forming an outer shell of the input device 50, a bottom plate 8 sealing the bottom open end of the housing 7, and a first support plate 9 and a second support plate 10 both secured to an upright wall 7a projecting from the top surface of the housing 7. The first and second support plates 9 and 10 are connected to each other and extend parallel to each other with a specific gap interposed therebetween. The operation knob 2 is provided at the top of a stem 3a of the slider 3. The operation knob 2 is exposed at the top of the base body 4. The base body 4 includes a support base 11 and preferably a vertically movable member 12. The support base 11 supports the slider 3 and allows the slider 3 to slide. The vertically movable member 12 is joined to the support base 11 and extends downward. The base body 4 is elastically urged upward by a pair of coil springs 13 functioning as first urging means. The force-feedback unit 5 includes first to third actuating members 14, 15, and 16 engaged with the slider 3, a pair of rotary motors 17 and 18, and sliding-detecting means (not illustrated) for detecting sliding of the operation knob 2. The push switch 6, i.e., the depressing-detecting means, detects depressing of the operation knob 2 and is activated by a downward movement of the vertically movable member 12 realized when the operation knob 2 is depressed.

The individual elements of the force-feedback multidirectional input device 50 will now be described in detail. The housing 7 included in the pedestal 1 preferably have a rectangular cylindrical space enclosed by the upright wall 7a. The rectangular cylindrical space is preferably divided into upper and lower spaces with a partition wall 7b extending from the inner wall surface of the upright wall 7a. The partition wall 7b has a pair of bosses 7c projecting therefrom. The bosses 7c receive the lower ends of the respective coil springs 13 fitted thereon. The upright wall 7a preferably has convex rails 7d provided on the four respective sides of the inner wall thereof at respective central positions. The convex rails 7d extend in the vertical direction through the partition wall 7b.

The first support plate 9 included in the pedestal 1 has a rectangular contour and has a plurality of clearance holes 9a in the outer peripheral portion thereof and three slits 9b, 9c, and 9d. As described separately below, the first to third actuating members 14, 15, and 16 preferably have respective engagement pins 14b, 15b, and 16b that are fitted in the respective slits 9b, 9c, and 9d with play. The first support plate 9 is placed on the upper end surface of the upright wall 7a. The second support plate 10 included in the pedestal 1 is placed on the partition wall 7b below the first support plate 9. The second support plate 10 is a metal sheet and has bent portions including attachment pieces 10a and regulating pieces 10b. The attachment pieces 10a extend upward from the four respective corners of the second support plate 10 and are bent, thereby having upside-down L shapes. The regulating pieces 10b project upward from respective positions between individual pairs of adjacent attachment pieces 10a. The second support plate 10 also has notches in which the bosses 7c projecting from the partition wall 7b are fitted, clearance holes in which drive shafts 17a and 18a of the rotary motors 17 and 18 are fitted, and the like. With the tips of the regulating pieces 10b of the second support plate 10 anchored to the first support plate 9, the four corners of the first support plate 9 and the attachment pieces 10a are screwed to the inner surface of the upright wall 7a at the four corners, whereby a space for housing the first to third actuating members 14, 15, and 16 is provided between the first support plate 9 and the second support plate 10.

A circuit board 19 is screwed to the bottom plate 8 of the pedestal 1. A connector 20 for external connection and the push switch 6 are provided on the circuit board 19. The circuit board 19 has arc-shaped holes 19a with reference to which the lower ends of the rotary motors 17 and 18 are positioned. The upper ends of the rotary motors 17 and 18 are screwed to the partition wall 7b. That is, the rotary motors 17 and 18 included in the force-feedback unit 5 are attached to the pedestal 1.

Figure 6:
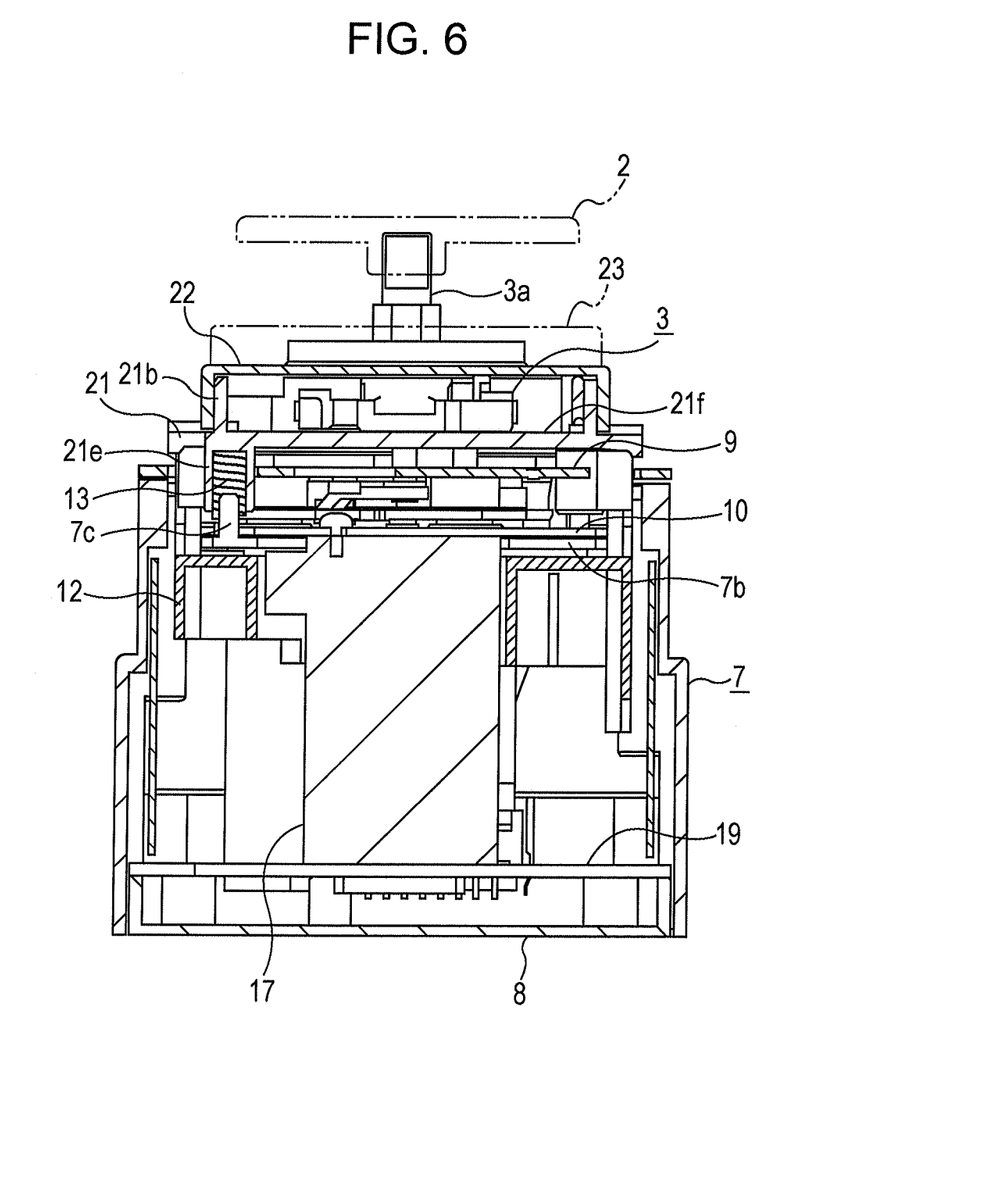
FIG. 6 is a cross-sectional view of the input device taken along line VI-VI of FIG. 2.

The support base 11 included in the base body 4 includes a rectangular lower base 21 and a rectangular upper base 22. The lower base 21 has a standing wall 21a standing along the outer periphery thereof and defining a space. The upper base 22 covers the space defined by the standing wall 21a. The lower base 21 and the upper base 22 are joined together with a snap configuration. An area of the lower base 21 facing the space defined by the standing wall 21a (hereinafter referred to as "inner bottom surface") preferably forms a slide contact surface 21f. The slide contact surface 21f and the bottom surface of the upper base 22 extend parallel to each other and face each other with a housing space 11a of specific dimensions defined therebetween. The slide contact surface 21f of the lower base 21 has slits 21b, 21c, and 21d having the same shapes as the respective slits 9b, 9c, and 9d of the first support plate 9. The engagement pins 14b, 15b, and 16b of the first to third actuating members 14, 15, and 16 extend through the respective slits 9b, 9c, and 9d and the respective slits 21b, 21c, and 21d and project upward from the slide contact surface 21f. A pair of spring-receiving cylinders 21e extend downward from the bottom surface of the lower base 21. The coil springs 13 are preferably positioned between the lower base 21 and the partition wall 7b such that two ends of each coil spring 13 are fitted to a corresponding one of the spring-receiving cylinders 21e and a corresponding one of the bosses 7c, respectively. Thus, the lower base 21 is urged upward by the elastic spring force of the coil springs 13, which are the first urging means (see FIG. 6). The upper base 22 has a rectangular opening 22a in a central portion thereof. The opening 22a communicates with the housing space 11a.

Figure 7:
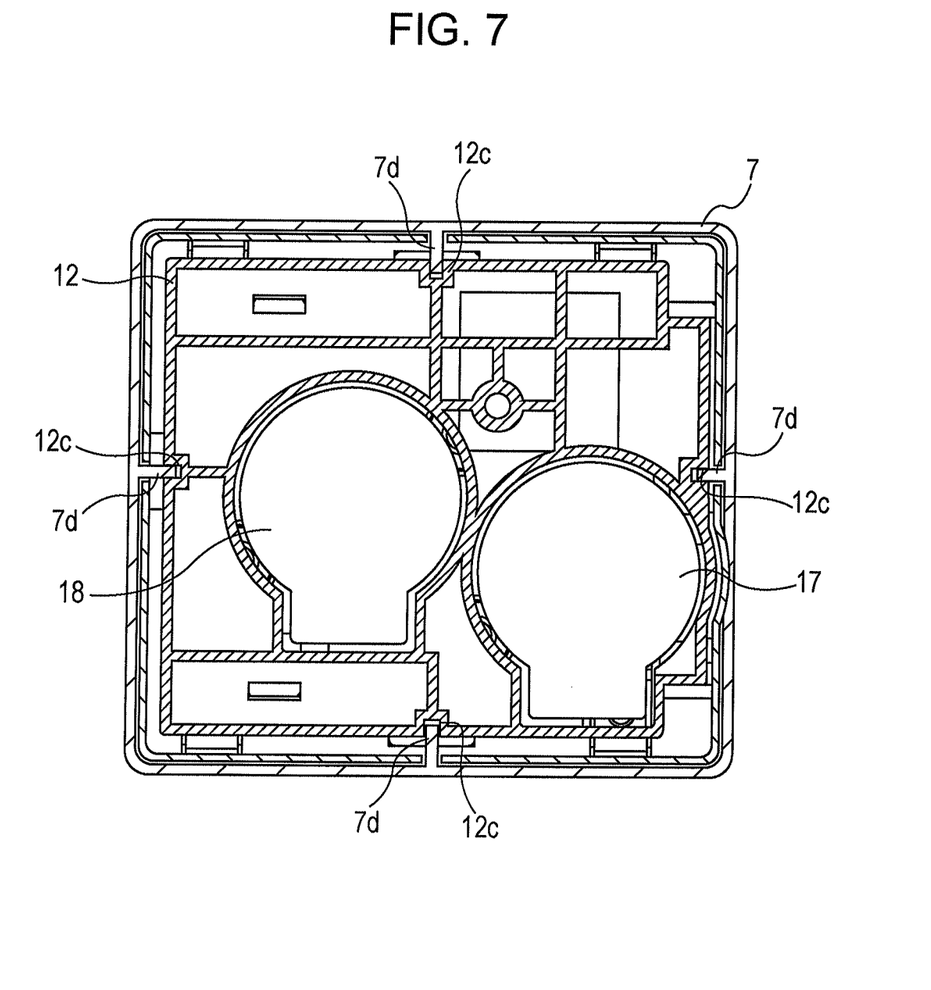
FIG. 7 is a transverse sectional view of the input device illustrated in FIG. 1.

The vertically movable member 12 included in the base body 4 has a rectangular contour and has a plurality of snap pieces 12a projecting from the top surface thereof. The vertically movable member 12 also has extension pieces 12b on the four respective sides of the outer wall thereof at respective central positions. The extension pieces 12b preferably have respective concave grooves 12c extending in the vertical direction. The vertically movable member 12 is fitted into the rectangular cylindrical space on the lower side of the partition wall 7b from the bottom opening of the housing 7, and the tips of the snap pieces 12a thus projecting upward from the partition wall 7b are anchored to the bottom surface of the lower base 21. Consequently, the lower base 21 (support base 11) and the vertically movable member 12 are joined together and form the base body 4. In joining the two, the concave grooves 12c of the vertically movable member 12 are slidably fitted onto the respective convex rails 7d of the housing 7 (see FIG. 7). Thus, the base body 4 (the support base 11 and the vertically movable member 12) is supported in such a manner as to be slidable in the vertical direction relative to the housing 7 of the pedestal 1. Each pair of a convex rail 7d and a concave groove 12c preferably form a guide portion. By joining the vertically movable member 12 to the lower base 21 of the support base 11, four guide portions are provided at 90-degree intervals on the outer side with respect to the slide contact surface 21f. As described above, the coil springs 13 interposed between the lower base 21 and the partition wall 7b elastically urges the support base 11 upward, and the urging force causes the top surface of the vertically movable member 12 to be pressed against the bottom surface of the partition wall 7b. Therefore, the base body 4 (the support base 11 and the vertically movable member 12) is prevented from moving upward by the partition wall 7b. That is, when the operation knob 2 is not depressed, the base body 4 including the support base 11 and the vertically movable member 12 is stably retained at a lifted position by the urging force of the coil springs 13, and the slider 3 is slidably supported by the support base 11 at the lifted position. Furthermore, when the operation knob 2 is depressed, the slider 3 is also depressed and the support base 11 moves downward against the urging force of the coil springs 13. Therefore, the vertically movable member 12 joined to the support base 11 can smoothly move downward within the space enclosed by the upright wall 7a of the housing 7 and along the guide portions (the convex rails 7d and the concave grooves 12c).

Figure 9:
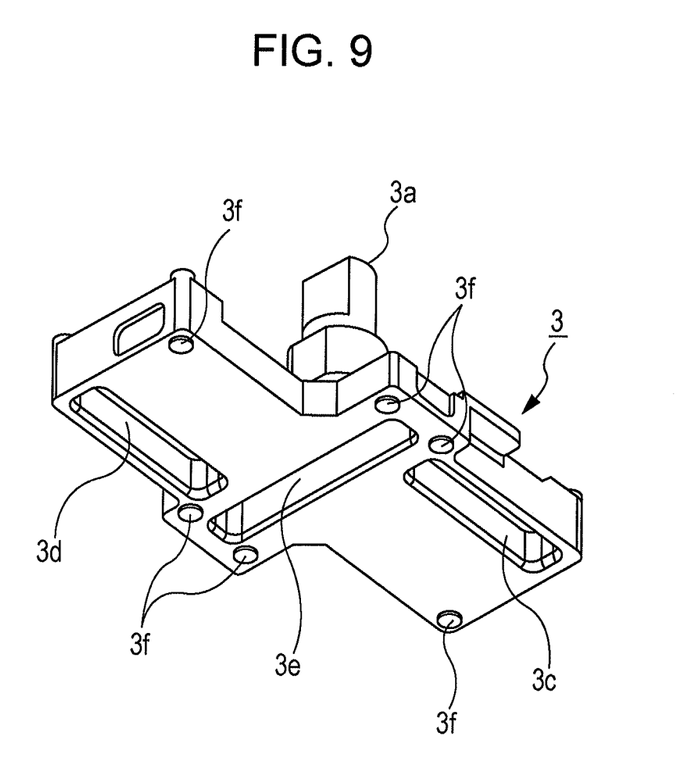
FIG. 9 is a perspective of a slider included in the input device illustrated in FIG. 1 seen from the bottom.

The slider 3 is housed in the housing space 11a defined by the support base 11. The slider 3 has the stem 3a standing from a central position of the top surface thereof. The slider 3 also has in the top surface thereof two recesses 3b provided on opposite sides of the stem 3a. The recesses 3b each receive a coil spring 24, which is a second urging means, and an actuating pin 25 (see FIG. 5). The tips of the actuating pins 25 to which the elastic spring force of the coil springs 24 is applied are pressed against the ceiling of the housing space 11a, i.e., the bottom surface of the upper base 22, producing a reactive force that causes the slider 3 to be elastically urged toward the slide contact surface 21f, i.e., the inner bottom surface of the housing space 11a. Referring to FIG. 9, the slider 3 preferably has three engagement grooves 3c, 3d, and 3e in the bottom surface thereof. The engagement groove 3e is provided immediately below the stem 3a. The engagement groove 3c and the engagement groove 3d extend from two respective ends of the engagement groove 3e parallel to each other but in opposite directions. The engagement pin 14b of the first actuating member 14 is slidably fitted in the engagement groove 3c. The engagement pin 15b of the second actuating member 15 is slidably fitted in the engagement groove 3d. The engagement pin 16b of the third actuating member 16 is slidably fitted in the engagement groove 3e. Furthermore, the slider 3 preferably has a plurality of projections 3f on the back surface thereof. The projections 3f receive the elastic urging force of the coil springs 24, i.e., the second urging means, and are thus pressed against the slide contact surface 21f. The projections 3f are provided near the outer edges of the back surface of the slider 3 such that at least two of the projections 3f are definitely provided on opposite sides of each of the engagement grooves 3c, 3d, and 3e. Specifically, two projections 3f are provided on opposite sides of the engagement groove 3d, other two projections 3f are provided on opposite sides of the engagement groove 3c, and a total of six projections 3f including the foregoing four projections 3f are provided on opposite sides of the engagement groove 3e.

The operation knob 2 is provided over the opening 22a of the upper base 22. A screen plate 23 having a rectangular contour is interposed between the operation knob 2 and the upper base 22. The stem 3a of the slider 3 extends through the opening 22a of the upper base 22 and is fitted in an anchoring hole 23a provided in the screen plate 23. The operation knob 2 and the slider 3 are joined together such that the bottom surface of the operation knob 2 is bonded to the tip of the stem 3a by press-fitting or the like. Since the screen plate 23 is much larger than the opening 22a, the opening 22a stays behind the screen plate 23 even if the operation knob 2 is slid in any direction. The operation knob 2 has a pair of recesses 2a in the top surface thereof. The user can easily operate the operation knob 2 by placing his/her finger in either of the recesses 2a.

The force-feedback unit 5 will now be described. The first and second actuating members 14 and 15 are driving-force-transmitting means interposed between the slider 3 and the rotary motor 17. The third actuating member 16 is driving-force-transmitting means interposed between the slider 3 and the rotary motor 18. As described above, the first to third actuating members 14, 15, and 16 are provided in the space defined between the first support plate 9 and the second support plate 10. The first actuating member 14 has a shaft 14a, the engagement pin 14b, and a gear portion 14c. The shaft 14a is rotatably supported by an upper bearing 26 provided on the side of the first support plate 9 and a lower bearing 27 provided on the side of the second support plate 10. The engagement pin 14b of the first actuating member 14 extends through the slit 9b of the first support plate 9 and the slit 21b of the lower base 21 and is slidably fitted in the engagement groove 3c of the slider 3. When the operation knob 2 is slid in such a direction that the slider 3 slides along the inner wall of the engagement groove 3c and thus moves the engagement pin 14b, the first actuating member 14 rotates while the engagement pin 14b moves in a planar direction within the slits 9b and 21b. The gear portion 14c is in mesh with the drive shaft 17a of the rotary motor 17. Therefore, when the first actuating member 14 is rotated by the slider 3, the drive shaft 17a rotates in conjunction with the first actuating member 14. In the other way round, when the rotary motor 17 is driven and the drive shaft 17a rotates, the first actuating member 14 rotates in conjunction with the drive shaft 17a and an external force is applied to the slider 3.

The second actuating member 15 includes a shaft 15a, the engagement pin 15b, and a gear portion 15c. The gear portion 15c is in mesh with the gear portion 14c of the first actuating member 14. The shaft 15a is rotatably supported by another upper bearing 26 provided on the side of the first support plate 9 and another lower bearing 27 provided on the side of the second support plate 10. The radius of rotation of the engagement pin 15b about the shaft 15a is substantially equal to the radius of rotation of the engagement pin 14b of the first actuating member 14. The engagement pin 15b of the second actuating member 15 extends through the slit 9c of the first support plate 9 and the slit 21c of the lower base 21 and is slidably fitted in the engagement groove 3d of the slider 3. When the operation knob 2 is slid in such a direction that the slider 3 slides along the inner wall of the engagement groove 3d and thus moves the engagement pin 15b, the second actuating member 15 rotates while the engagement pin 15b moves in a planar direction within the slits 9c and 21c. Note that the second actuating member 15 always rotates synchronously with the first actuating member 14 and that the driving force of the rotary motor 17 is transmitted to the second actuating member 15 through the first actuating member 14.

Figure 3:
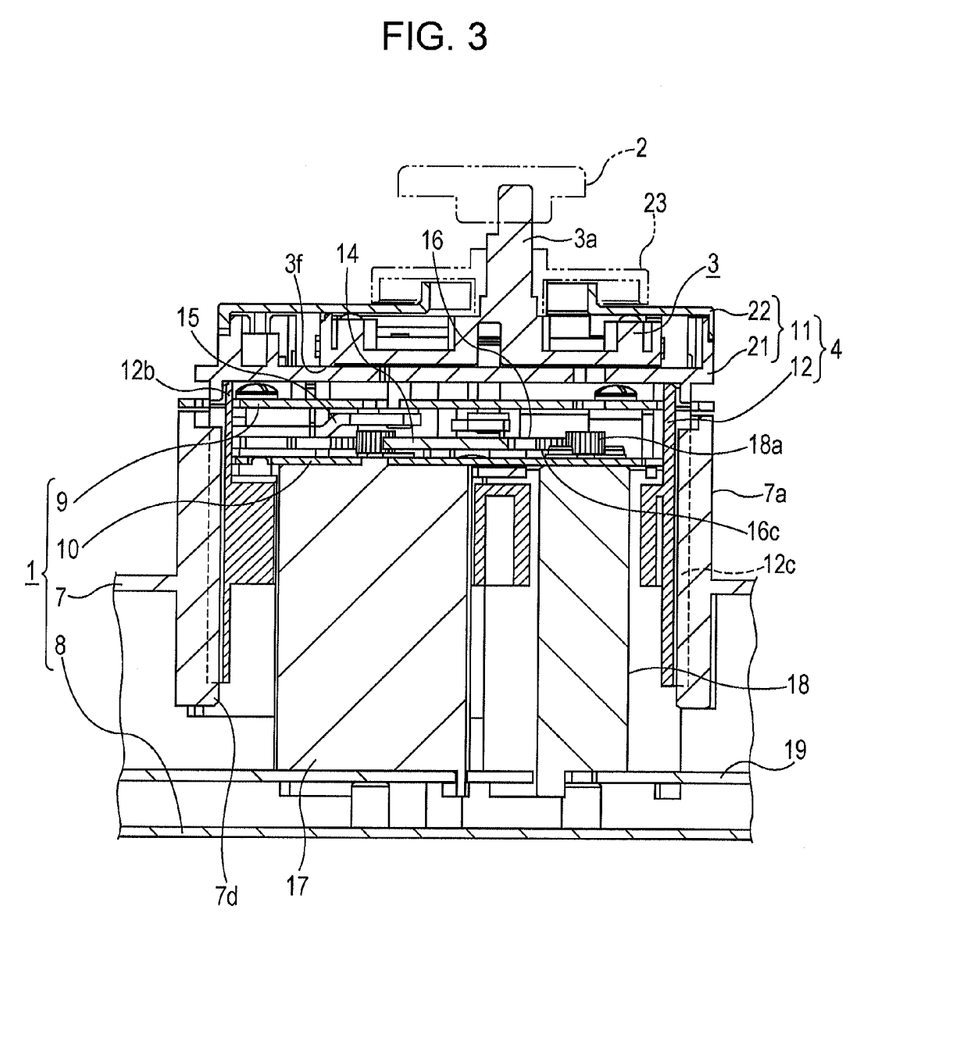
FIG. 3 is a cross-sectional view of the input device taken along line III-III of FIG. 2.
Figure 4:
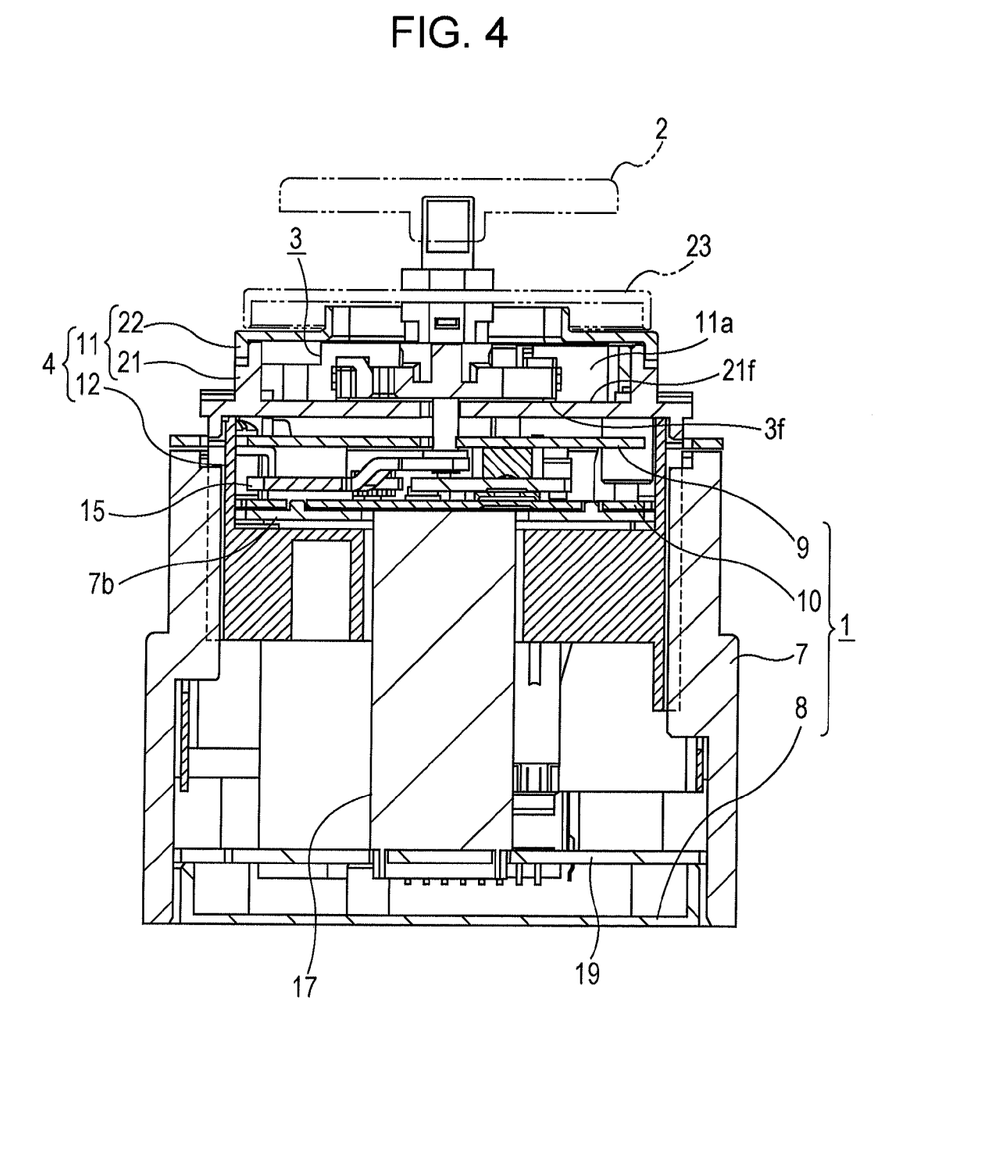
FIG. 4 is a cross-sectional view of the input device taken along line IV-IV of FIG. 2.
Figure 5:
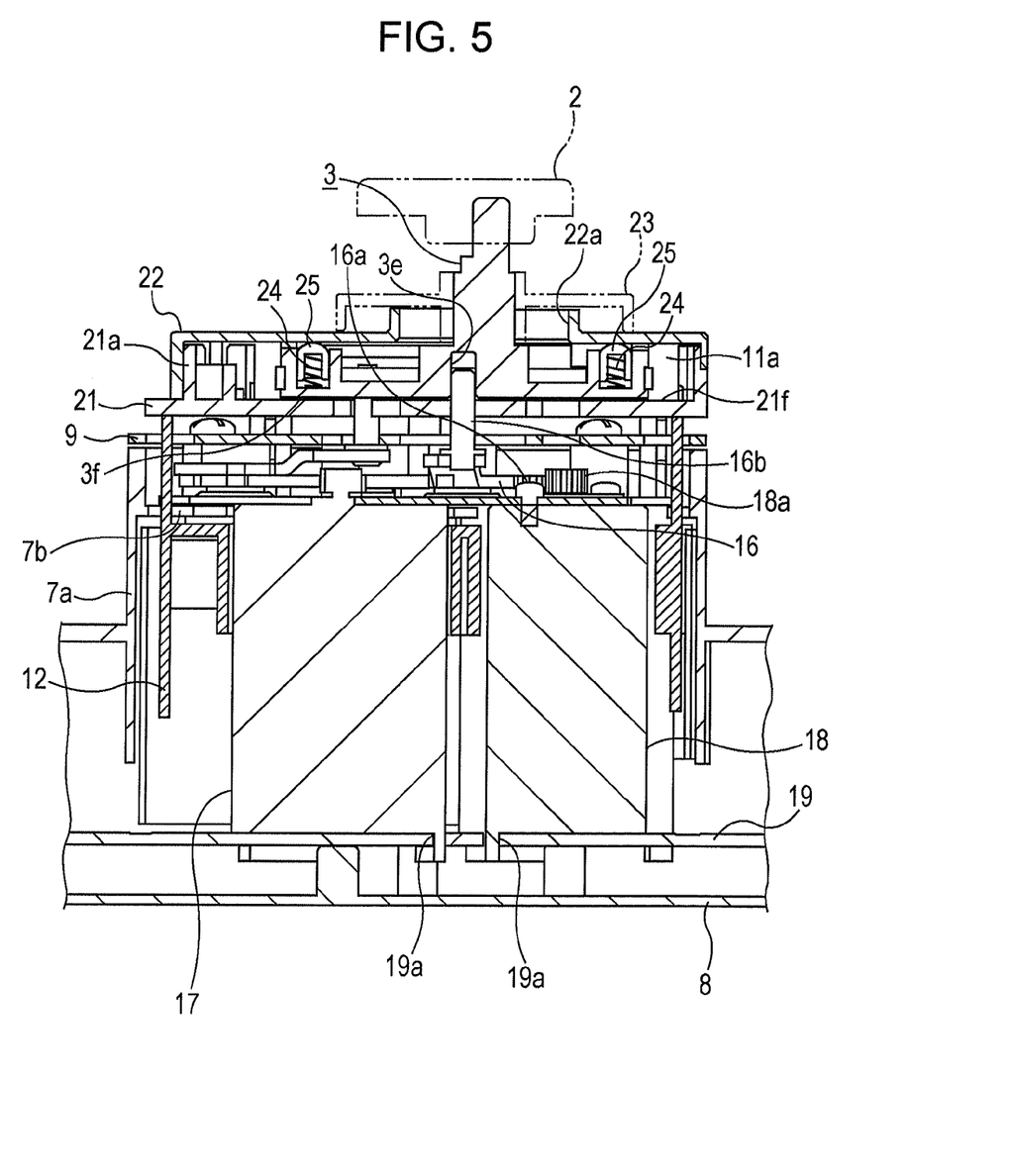
FIG. 5 is a cross-sectional view of the input device taken along line V-V of FIG. 2.

The third actuating member 16 includes a shaft 16a, the engagement pin 16b, and a gear portion 16c. The shaft 16a is rotatably supported by yet another upper bearing 26 provided on the side of the first support plate 9 and yet another lower bearing 27 provided on the side of the second support plate 10. The engagement pin 16b extends through the slit 9d of the first support plate 9 and the slit 21d of the lower base 21 and is slidably fitted in the engagement groove 3e of the slider 3. When the operation knob 2 is slid in such a direction that the slider 3 slides along the inner wall of the engagement groove 3e and thus moves the engagement pin 16b, the third actuating member 16 rotates while the engagement pin 16b moves in a planar direction within the slits 9d and 21d. Referring to FIGS. 3 and 5, the gear portion 16c of the third actuating member 16 is in mesh with the drive shaft 18a of the rotary motor 18. Therefore, when the third actuating member 16 is rotated by the slider 3, the drive shaft 18a rotates in conjunction with the third actuating member 16. In the other way round, when the rotary motor 18 is driven and the drive shaft 18a rotates, the third actuating member 16 rotates in conjunction with the drive shaft 18a and an external force is applied to the slider 3.

The sliding-detecting means (not illustrated) included in the force-feedback unit 5 is a rotary encoder or the like configured to detect, for example, the directions and angles of rotation of the individual drive shafts 17a and 18a. The sliding-detecting means and the depressing-detecting means, i.e., the push switch 6, are connected to an external control unit (not illustrated) through the connector 20.

The operation of the force-feedback multidirectional input device 50 configured as above will now be described.

Figure 2:
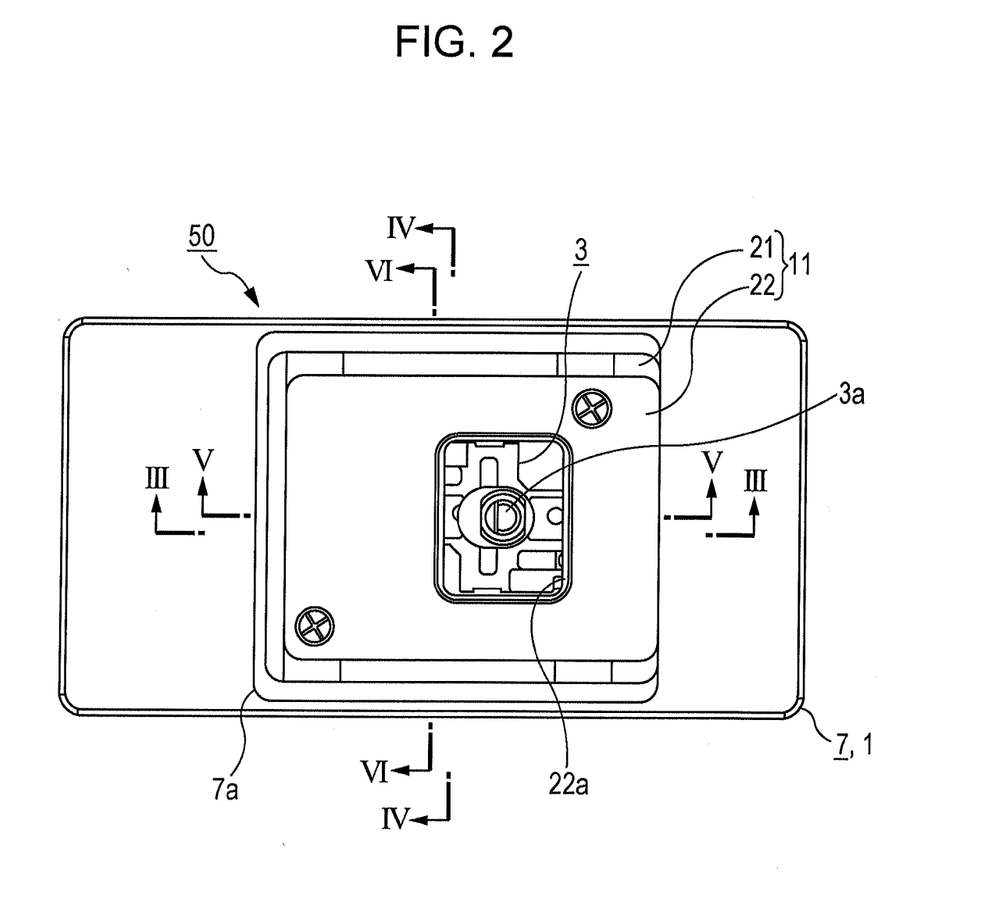
FIG. 2 is a plan view of the input device illustrated in FIG. 1 with an operation knob and a screen plate removed.

When a system including the force-feedback multidirectional input device 50 is activated (the power of the system is turned on), the control unit (not illustrated) controls the rotary motor 17 and the rotary motor 18 such that the slider 3 automatically returns to the neutral position. Thus, the slider 3 and the operation knob 2 are brought to their respective initial positions as illustrated in FIGS. 1 and 2. In this state, when the user slides the operation knob 2 in any direction, the projections 3f of the slider 3 that slides together with the operation knob 2 slide on the slide contact surface 21f of the lower base 21, and the slider 3 moves the engagement pins 14b and 15b and the engagement pin 16b, thereby rotating the first and second actuating members 14 and 15 and the third actuating member 16. In conjunction with these rotations, the drive shaft 17a of the rotary motor 17 and the drive shaft 18a of the rotary motor 18 rotate. Consequently, the sliding-detecting means included in the force-feedback unit 5 detects the sliding of the slider 3 and outputs a corresponding detection signal to the control unit. The control unit then calculates the direction and amount of sliding of the operation knob 2 (slider 3) and outputs control signals based on the results of the calculation to the rotary motor 17 and the rotary motor 18. That is, when the operation knob 2 is slid in a specific direction by a specific amount, the rotary motor 17 and the rotary motor 18 are driven and are controlled such that an external force such as the resistance against the sliding operation, the thrust promoting the sliding operation, or vibration is fed back to the slider 3 through the first to third actuating members 14, 15, and 16. Thus, an appropriately selected external force (sense of force) such as resistance, thrust, or vibration is fed back to the finger of the user whose is sliding the operation knob 2.

When the user depresses the operation knob 2 by a specific amount while sliding the operation knob 2, the depressing of the slider 3 causes the support base 11 (the lower base 21 and the upper base 22) to move downward against the urging force of the coil springs 13. Accordingly, the vertically movable member 12 joined to the support base 11 moves downward along the guide portions (the convex rails 7d and the concave grooves 12c) and presses and activates the push switch 6 with the bottom surface thereof. Consequently, the push switch 6 outputs a depressing-detection signal to the control unit, whereby the depressing of the operation knob 2 is detected. Thus, a series of operation can be performed in which, for example, the operation knob 2 is slid to select any item from a menu and is then depressed to fix the selected item.

When the operation knob 2 is depressed, the push switch 6 provides a tactile clicking sensation. With this tactile clicking sensation, the user can feel with his/her finger that the depressing operation has been assuredly performed. Furthermore, when the user removes the depressing force from the operation knob 2, the actuating pins 25 are lifted up to the initial levels by the respective coil springs 24 and the base body 4 (the support base 11 and the vertically movable member 12) is lifted up to the initial level by the elastic urging force of the coil springs 13. Thus, the slider 3 and the operation knob 2 automatically return to their respective positions that they had before the depressing operation.

As described thus far, in the force-feedback multidirectional input device 50 according to the present embodiment, the slider 3 is supported in such a manner as to be slidable along the inner bottom surface of the housing space 11a defined in the support base 11 included in the base body 4. Furthermore, depressing of the operation knob 2 joined to the slider 3 is detected by the push switch 6 on the basis of the downward movement of the base body 4 (the support base 11 and the vertically movable member 12) realized in conjunction with the depressing of the slider 3. Furthermore, the push switch 6 is provided on the circuit board 19 attached to the bottom plate 8 of the pedestal 1. Therefore, the sliding operation and the depressing operation can be selectively performed on the operation knob 2 with less complicated electrical wiring for the push switch 6. Thus, the practical value of the force-feedback multidirectional input device 50 as a product can be increased. Furthermore, in the force-feedback multidirectional input device 50, the support base 11 of the base body 4 is retained at the lifted position with the vertically movable member 12 being pressed against the bottom surface of the partition wall 7b of the pedestal 1 by the elastic spring force of the coil springs 13 (first urging means). In addition, the slider 3 is urged by the elastic spring force of the coil springs 24 (second urging means) toward the inner bottom surface of the housing space 11a defined in the support base 11. Therefore, desired frictional forces can be produced between the slider 3 and both of the ceiling and the inner bottom surface of the housing space 11a. Thus, rattling of the slider 3 and the operation knob 2 that may occur when the input device 50 is not operated can be suppressed. Consequently, unpleasant sound (rattle noise) can be suppressed. Furthermore, in the present embodiment, a push switch is employed as the depressing-detecting means for detecting depressing of the operation knob 2. Therefore, both of the sliding operation and the depressing operation are detectable with a simple configuration and high reliability. The depressing-detecting means may not necessarily be a push switch and may alternatively be a photointerrupter or the like.

In the force-feedback multidirectional input device 50 according to the present embodiment, the force-feedback unit 5 is capable of feeding back, to the operation knob 2, the sense of force acting in the planar direction based on the sliding of the slider 3 and includes the first to third actuating members 14, 15, and 16. The first to third actuating members 14, 15, and 16 preferably have the respective engagement pins 14b, 15b, and 16b movable in the planar direction. Furthermore, the slider 3 preferably has at the bottom surface thereof the engagement grooves 3c, 3d, and 3e in which the respective engagement pins 14b, 15b, and 16b are fitted in such a manner as to be slidable in the vertical direction and the plurality of projections 3f projecting downward at positions on opposite sides of the individual engagement grooves 3c, 3d, and 3e. Furthermore, the inner bottom surface of the housing space 11a defined in the support base 11 preferably forms the slide contact surface 21f that is in slide contact with the projections 3f. Furthermore, the base body 4 is preferably guided to move in the vertical direction relative to the pedestal 1 by the plurality of guide portions (the convex rails 7d and the concave grooves 12c) provided on the outer side with respect to the slide contact surface 21f. In such a configuration, even if a pressing force is applied obliquely to the slider 3 through the operation knob 2, the plurality of projections 3f provided on the opposite sides of the individual engagement grooves 3c, 3d, and 3e definitely act as the points of application of the force from the slider 3 on the slide contact surface 21f. Hence, the base body 4 can straightly move downward along the guide portions. Accordingly, the slider 3 that is in slide contact with the slide contact surface 21f can move downward without being tilted, and the engagement grooves 3c, 3d, and 3e are not caught by the engagement pins 14b, 15b, and 16b of the first to third actuating members 14, 15, and 16 while the slider 3 is moving downward. Thus, a smooth depressing operation can be realized under any conditions.

In the force-feedback multidirectional input device 50 according to the present embodiment, the upright wall 7a provided on the housing 7 of the pedestal 1 preferably defines on the inner side thereof the rectangular cylindrical space in which the vertically movable member 12 of the base body 4 is housed. Furthermore, the guide portions that guide the base body 4 in the vertical direction relative to the pedestal 1 are preferably provided in the form of a combination of the concave grooves 12c provided in the four outer wall surfaces of the vertically movable member 12 and the respective convex rails 7d provided on the four inner wall surfaces of the upright wall 7a that are fitted to each other. In such a configuration, the distance between each pair of guide portions provided on opposite sides of the vertically movable member 12 is maximized, and the base body 4 can stably move in the vertical direction relative to the pedestal 1. Moreover, in the present embodiment, the rectangular cylindrical space defined by the upright wall 7a of the housing 7 is preferably divided into upper and lower spaces by the partition wall 7b. Furthermore, the coil springs 13, i.e., the first urging means, are preferably interposed between the partition wall 7b and the lower base 21 of the support base 11. Furthermore, the guide portions (concave grooves 12c) are preferably provided in the outer wall surfaces of the vertically movable member 12 that is pressed against the bottom surface of the partition wall 7b by the elastic spring force of the coil springs 13. In such a configuration, when the input device 50 is not operated, the base body 4 can be stably retained at the lifted position. Furthermore, when the depressing operation is performed, the base body 4 can stably move downward along the guide portions provided on the vertically movable member 12.

The above embodiment concerns a case where the guide portions that guide the base body 4 in the vertical direction relative to the pedestal 1 are provided in the form of a combination of the convex rails 7d provided on the inner wall surfaces of the upright wall 7a of the housing 7 and the respective concave grooves 12c provided in the outer wall surfaces of the vertically movable member 12 that are slidably fitted to each other. In the other way round, concave grooves may be provided in the inner wall surfaces of the upright wall 7a in such a manner as to fit on respective convex rails that are provided on the outer wall surfaces of the vertically movable member 12. Alternatively, the inner wall surfaces of the upright wall 7a may have both concave grooves and convex rails, and the outer wall surfaces of the vertically movable member 12 may also have both concave grooves and convex rails, so that respective pairs of concave grooves and convex rails provided on the upright wall 7a and the vertically movable member 12 are fitted to each other.

What is claimed is:

1. A force-feedback multidirectional input device comprising:
    a base body having a housing space;
    a slider supported to be slidable along an inner bottom surface of the housing space;
    an operation knob joined to the slider and exposed at the top of the base body;
    a force-feedback unit including a driving-force-transmitting mechanism engaged with the slider, the unit being capable of feeding back, to the operation knob, a sense of force acting in a planar direction based on the sliding of the slider;
    a pedestal on which the force-feedback unit is provided;
    a depressing-detecting mechanism that detects depressing of the operation knob, the depressing-detecting mechanism provided on the pedestal;
    a first urging mechanism that elastically urges the base body upward; and
    a second urging mechanism that elastically urges the slider toward the inner bottom surface of the housing space,
    wherein the base body is supported in such a manner as to be movable in a vertical direction relative to the pedestal, and
    wherein, when the operation knob is depressed, the slider is depressed and causes the base body to move downward against the urging force of the first urging mechanism, the downward movement of the base body realizing the detection performed by the depressing-detecting mechanism.

2. The force-feedback multidirectional input device according to claim 1,
    wherein the force-feedback unit includes an engagement pin movable in the planar direction,
    wherein the slider includes at a bottom surface thereof an engagement groove and a plurality of projections, the engagement groove receiving the engagement pin fitted therein as to be slidable in the vertical direction, the plurality of projections projecting downward from respective positions on opposite sides of the engagement groove, and wherein the base body includes a slide contact surface that is in slide contact with the projections, the base body configured to be guided as to be movable in the vertical direction relative to the pedestal by a plurality of guide portions provided on an outer side with respect to the slide contact surface.

3. The force-feedback multidirectional input device according to claim 2, wherein the pedestal has a rectangular cylindrical space that houses at least part of the base body, and wherein the guide portions each include a convex rail and a concave groove, the convex rail being provided on one of an inner wall surface of the rectangular cylindrical space and an outer wall surface of the base body, the concave groove being provided on the other of the inner wall surface of the rectangular cylindrical space and the outer wall surface of the base body and engaged with the convex rail.

4. The force-feedback multidirectional input device according to claim 3, wherein the pedestal includes a partition wall dividing the rectangular cylindrical space into upper and lower spaces, wherein the first urging mechanism is interposed between the partition wall and the base body, wherein the base body includes a vertically movable member extending downward from the partition wall, and wherein one of the convex rail and the concave groove is provided on an outer wall surface of the vertically movable member.

5. The force-feedback multidirectional input device according to claim 1, wherein the depressing-detecting mechanism comprises a push switch.

* * * * *